United States Patent [19]
Pollock et al.

[11] Patent Number: 5,629,593
[45] Date of Patent: May 13, 1997

[54] OUTPUT TORQUE MATCHING IN A MULTI-SPEED ELECTRIC VEHICLE

[75] Inventors: Frederick J. Pollock, Royal Oak; Douglas E. Trombley, Grosse Pointe Woods, both of Mich.

[73] Assignee: General Motors Corporation, Detroit, Mich.

[21] Appl. No.: 574,568

[22] Filed: Dec. 14, 1995

[51] Int. Cl.$^6$ .............................. B60K 23/00; H02P 7/36
[52] U.S. Cl. ........................ 318/432; 180/338; 477/15; 477/69
[58] Field of Search .................................. 318/9, 11, 12, 318/139, 430, 432, 433; 180/337, 338, 364; 74/393, 473 R; 477/15, 34, 37, 68, 69

[56] References Cited

U.S. PATENT DOCUMENTS

| | | | |
|---|---|---|---|
| 3,703,109 | 11/1972 | Irie et al. | 477/139 |
| 4,096,418 | 6/1978 | Marumoto et al. | 318/12 |
| 4,611,507 | 9/1986 | Burkel et al. | |

*Primary Examiner*—Bentsu Ro
*Attorney, Agent, or Firm*—Vincent A. Cichosz

[57] ABSTRACT

In an electrically driven vehicle having an automatic transmission for coupling motor output torque to at least one drivewheel through a selected one of at least a pair of speed ratios, a method of matching the post-shift output torque to the preshift output torque is disclosed whereby undesirable post-shift driveline disturbances such as driveline sag are eliminated and post-shift vehicle performance is not compromised due to changes in output torque.

8 Claims, 2 Drawing Sheets

OUTPUT TORQUE MATCHING IN A MULTI-SPEED ELECTRIC VEHICLE

BACKGROUND

The present invention is related to electrically driven motor vehicles, and in particular motor torque control during shifting of a multi-speed transmission coupled between the motor output and the drive wheels.

Given that the speed of the output member of a multi-speed transmission remains substantially constant during a gear change, it necessarily follows that the input member of the transmission must undergo a substantial speed change in order to complete the gear change. In an upshift, the input member of the transmission experiences a deceleration to a lower speed. Therefore, the prime mover coupled to the input member of the transmission also undergoes a substantial decelerating speed change in effectuating such a gear change. In a downshift, the input member of the transmission experiences a acceleration to a higher speed. Therefore, the prime mover coupled to the input member of the transmission also undergoes a substantial acceleration or deceleration in effectuating a gear change.

Generally, the torque produced by an internal combustion engine varies significantly with engine speed. The torque coupled to the input member of the transmission immediately following an upshift gear change in a vehicle powered by an internal combustion engine therefore is typically lower than that coupled to the input member immediately prior to the upshift. The output torque is also characteristically lower after the upshift is complete than it is prior thereto, due in part to the lower input torque and to the lower ratio associated with the new gear. These are well known mechanics of a power-on upshift gear changes. Vehicle operators have become accustomed during power-on upshifts to increasing the accelerator pedal position in an attempt to maintain the level of vehicle performance (i.e. output torque) in the new gear as was present in the old gear. Correspondingly similar occurrences are found with power-on downshifts, however with respect to higher output torques and operator responses thereto.

On the other hand, electric traction motors are known to be able to produce torque output substantially independent of operating speed with appropriate motor current at least within a range of operating speeds below a base speed. Electric vehicles are known having a traditional accelerator pedal for controlling the motor output and vehicle performance in a manner analogous to an internal combustion powered vehicle. However, accelerator pedal position as associated with an electric vehicle application conventionally is used to control motor current. Upshifting in an electrically-driven vehicle having an automatic multi-speed transmission may result in an undesirable driveline sag once the speed change has occurred. After the speed change, the motor will be operating at a lower speed and, if the accelerator pedal position remains substantially unchanged from its pre-shift position, motor current too remains unchanged. The torque output of the motor will be substantially the same as before the speed change and the output torque or wheel torque will decrease in correspondence with the difference between the old and new speed ratios. Correspondingly similar occurrences are found with power-on downshifts, however with respect to higher output torques.

SUMMARY

A method of operating an electric vehicle whereby the output torque prior to a ratio change is maintained at substantially the same level subsequent to the ratio change. An electric vehicle comprises a drivetrain including an electric motor coupled to an automatic multiple speed ratio transmission through an input member. The input member is in turn coupled through one of a plurality of friction devices to a corresponding gear set to establish a respective speed ratio. The gear set is in turn coupled to an output member of the transmission whereat an output torque is established for propelling the vehicle. The output torque is controlled in response to an operator controlled accelerator pedal position. A microcomputer based controller provides shift control functions to the transmission and motor control function to the electric motor hardware.

When a shift from one ratio to another ratio is indicated, the control performs calculations of a pre-shift output torque, the pre-shift output torque being indicative of the output torque immediately preceding the incipient ratio change. The calculations are based upon predetermined operating parameters of the drivetrain including motor parameters and transmission parameters. From such pre-shift output torque, and further with known post-shift parameters, a value of a post-shift operating parameter of the electric motor, such as motor current or slip speed, is determined which will produce a post-shift output torque of substantial equivalency to the pre-shift output torque. Such post-shift operating value is then established preferably through the ratio change to thereby result in the output torque at the output member following the ratio change at the pre-shift output torque.

Additionally, changes in accelerator pedal position from a pre-shift position may result in the establishment of a post-shift output torque at the output member subsequent the ratio change which corresponds to the change in accelerator pedal position.

BRIEF DESCRIPTION OF THE DRAWINGS

The present invention will now be described, by way of example, with reference to the accompanying drawings, in which.

DETAILED DESCRIPTION

Figure 1:
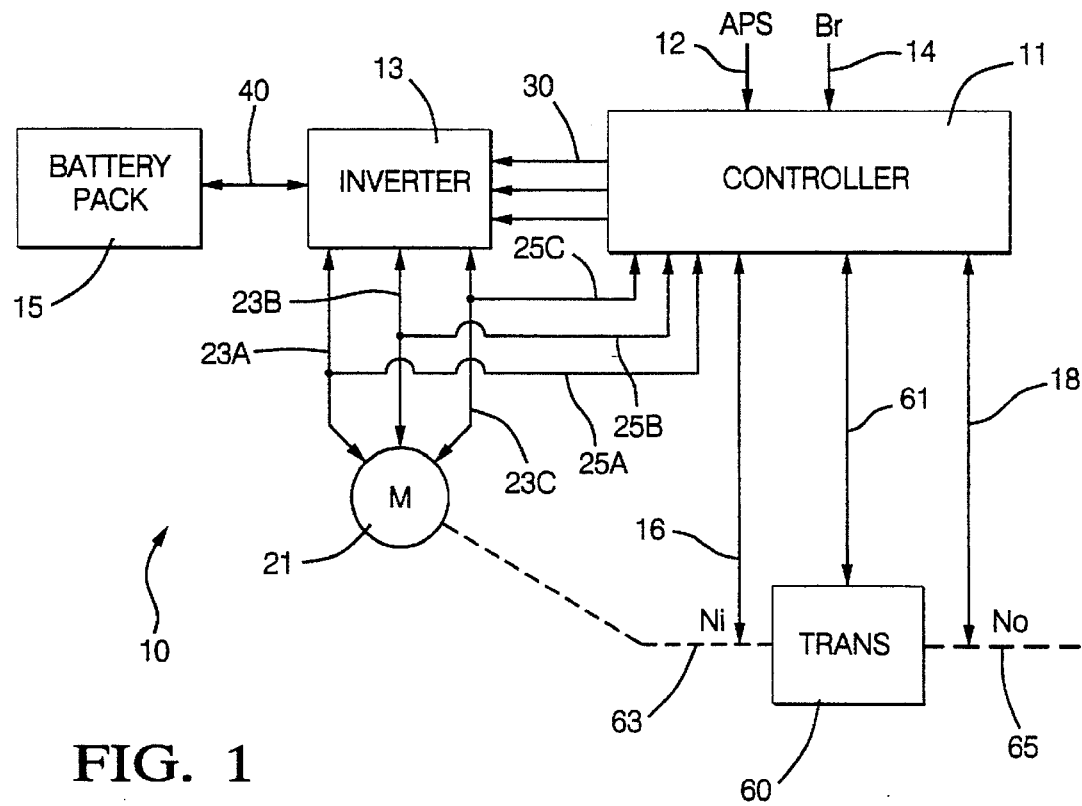
FIG. 1 is a schematic illustration of an electric vehicle having an AC induction motor rotatably coupled to a conventional multi-speed transmission.

Referring first to FIG. 1, relevant portions of an exemplary electric vehicle drivetrain and microcomputer based control therefor suitable for implementation of the present invention is generally labeled 10. The drivetrain comprises a tractive motor 21, assumed in the present embodiment to be a multiphase AC induction machine, and specifically a three-phase AC induction machine. The output shaft of the motor is coupled to the input member 63 of a multiple speed ratio automatic transmission 60. The transmission in mm has an output member 65 coupled to other drivetrain components (not shown) including a final drive gear set, differential and axles. Each stator phase winding of the motor 21 is coupled bi-directionally to a high voltage battery pack 15 vis-a-vis bi-directional power bus 40, inverter 13 and respective bi-directional phase lines 23a, 23b and 23c. Inverter 13 is adapted to provide the motor 21 stator with an appropriate rotating field to effectuate the desired operation of thereof. The motor 21 may actually be operated to provide drive-wheel torque for propelling the vehicle or operated in a regenerative mode for producing electric power for charging battery pack 15.

The inverter operation is controlled by a microcomputer based controller 11 comprising such conventional elements as a micro-processor, I/O, ROM, RAM and clock (not individually illustrated). The controller 11 is interfaced with the inverter via command lines 30 for establishing the desired torque characteristics of the motor 21 in accordance with operator demand such as from a accelerator position sensor (APS) input and service brake input at lines 12 and 14 respectively, and current sense signals from the three phase lines via sense lines 25A, 25b and 25c. Typically, such control is effectuated by way of data stored in table format in RAM. U.S. Pat. No. 5,099,186 assigned to the assignee of the present invention sets forth in detail an exemplary motor drive and recharge system. It is to be understood, however, that other motor and control arrangements may be employed for carrying out the present output torque matching control.

In addition to motor control functions, the controller 11 is also adapted for implementing such control functions as are generally well known and conventionally practiced with multi-speed automatic transmissions. A conventional multi-speed transmission is labeled generally as 60 and is understood to comprise such conventional elements as input and output members, one or more planetary gear sets and a plurality of torque transmitting devices in the form of fluid operated clutches and band brakes. Transmission 60 is further characterized by a conventional mechanical fluid pump driven with the input member for supplying pressurized working fluid for the hydraulic control, lubrication and cooling of the transmission. Alternatively, a separate fluid motor may be employed for maintaining fluid pressure in the transmission.

The present embodiment will be described in reference to transmission 60 wherein a ratio change is accomplished by releasing a first friction device associated with a current speed ratio and engaging a second friction device associated with the desired speed ratio. The friction device associated with the current speed ratio may herein be referred to as the offgoing (OFG) clutch while the second friction device associated with the desired speed ratio may be referred to as the oncoming (ONC) clutch. Release and engagement of friction devices are effectuated by controlled exhaust and supply of the fluid pressure through respective pulse width modulated (PWM) pressure control valves. Such control valves are individually controlled by respective PWM signals. The PWM signals are generated in response to a predetermined set of instructions in the controller 11 in accordance with well known techniques. Line 61 represent such PWM control lines for controlling the pressure control valves. Additionally, such conventional quantities used in the control of multi-ratio transmission as transmission input member speed (Ni) and output member speed (No) are shown input to controller 11 at lines 16 and 18 respectively. Input speed Ni is the speed of the input member of the transmission 60 and in the present embodiment corresponds to the speed of the rotor of the motor 21, it being assumed that a 1:1 speed ratio is effected by any mechanical linkages such as chain and sprocket drives, spur gears, etc. therebetween.

Figure 3A:
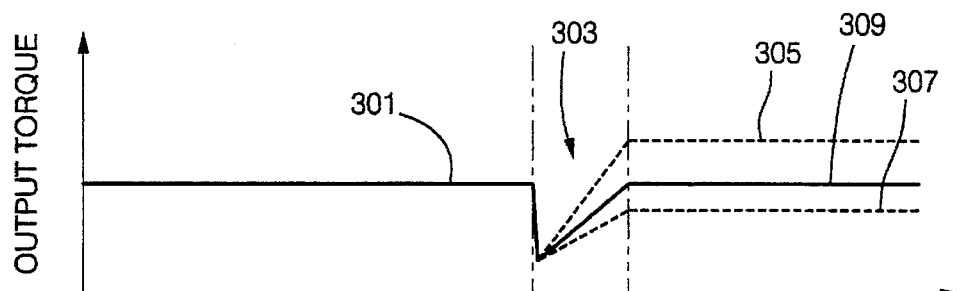
FIGS. 3A–3C illustrate generally various quantities of an output torque matching upshift performed in accordance with the present invention.
Figure 3B:
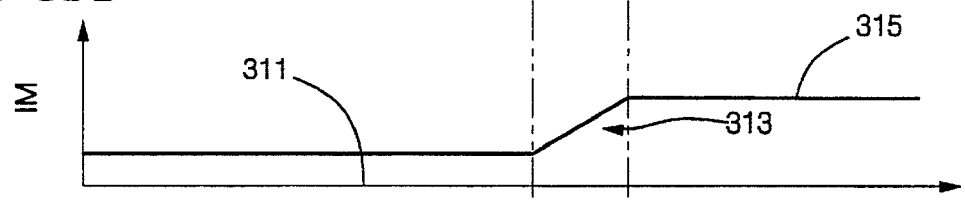
Figure 3C:
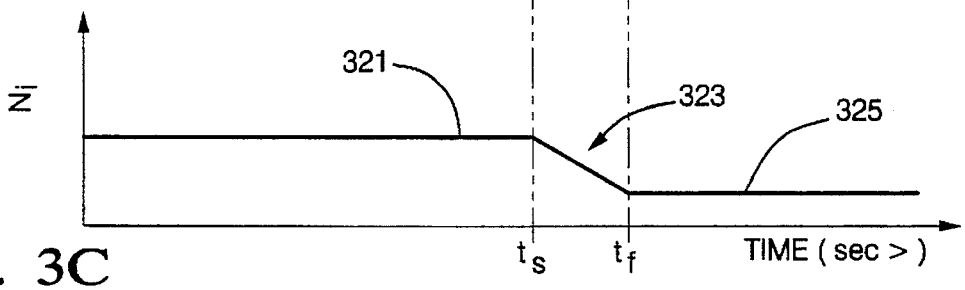

With reference now to FIGS. 3A–3C a general representation of an upshift performed in accordance with the present invention is illustrated. The trace in FIG. 3A is shown having a portion 301 thereof representing a substantially steady output torque prior to a ratio change. The section generally designated 303 in the figure represents a period $t_s$ through $t_f$ through which the ratio change is effectuated. It is during such period that the offgoing clutch is released and the oncoming clutch is engaged. As the torque capacity of the offgoing clutch is reduced, the input member and any drive torque associated therewith begins to decouple form the output member and consequently the output torque begins to fall. Assuming that an upshift is being performed and that the input torque at the input member remains unchanged, establishing torque capacity at the oncoming clutch would exhibit a characteristic output torque curve as labeled 307. As previously described, the lower output torque as between pre-shift and post-shift would result in objectionable driveline sag. On the other hand, assuming a downshift is invoked, the establishment of torque capacity at the oncoming clutch would exhibit a characteristic output torque curve as labeled 305. In this case, the higher output torque as between pre-shift and post-shift would result in objectionable driveline torque excesses. The objective of the present invention is to produce a torque match as between the pre-shift and post-shift output torque quantities as illustrated as the solid curve 309. However, since it is known that the input member speed is the variable rotational quantity pre-shift vs. post-shift, the present invention takes steps to predict the input torque at the new speed ratio necessary to maintain equivalency of pre-shift and post-shift output torques. FIG. 3C illustrates generally the characteristic rotational speed change which occurs as the result of a speed ratio change to a lower speed ratio (upshift). From the time prior to the shift, line 321 represent a substantially stable input speed Ni. During the ratio change $t_s$ through $t_f$, generally designated 323, the input member speed drops to a speed synchronous with a gear set member to which input coupling is effected. Put another way, the speed differential across the oncoming clutch is substantially zero at synchronous speed. The precise methodology utilized to accomplish synchronous operation may include input speed pull-up or pull-down through application of the oncoming clutch, natural inertial decay or regenerative energy extraction for input member slow down in the case of upshifts, or input member acceleration through motoring control. The precise technique of synchronization is most heavily influenced by the desired shift feel, desired shift duration as well as inertial and shift energy management/dissipation considerations.

Referring to FIG. 3B, the portion 311 of the line is representative of the relative motor current IM being delivered in accordance with operator demand via throttle actuation. In order that the undesirable shift sag be avoided post-shift, a value of post-shift motor current 315 is calculated from known pre-shift and predicted post-shift quantities. These quantities include the pre-shift and post-shift input member speeds, pre-shift and post-shift speed ratios, and the pre-shift motor current. Between the start and finish of the shift, $t_s$ through $t_f$, the motor current IM undergoes a net increase. Again, depending upon the utilization of the motor in synchronizing the input member to the new speed ratio gear set member to which input coupling is effected (i.e. regenerative deceleration or acceleration thereof), the precise requirements of motor current during the shift may vary from that illustrated. Alternative motor operating parameters having known effects upon the torque produced thereby may similarly be utilized in the control thereof in addition to or in place of the motor current. For example, in AC induction machines, the stator field rotational frequency may be altered to control the slip speed of the motor and hence the torque characteristic thereof.

Figure 2:
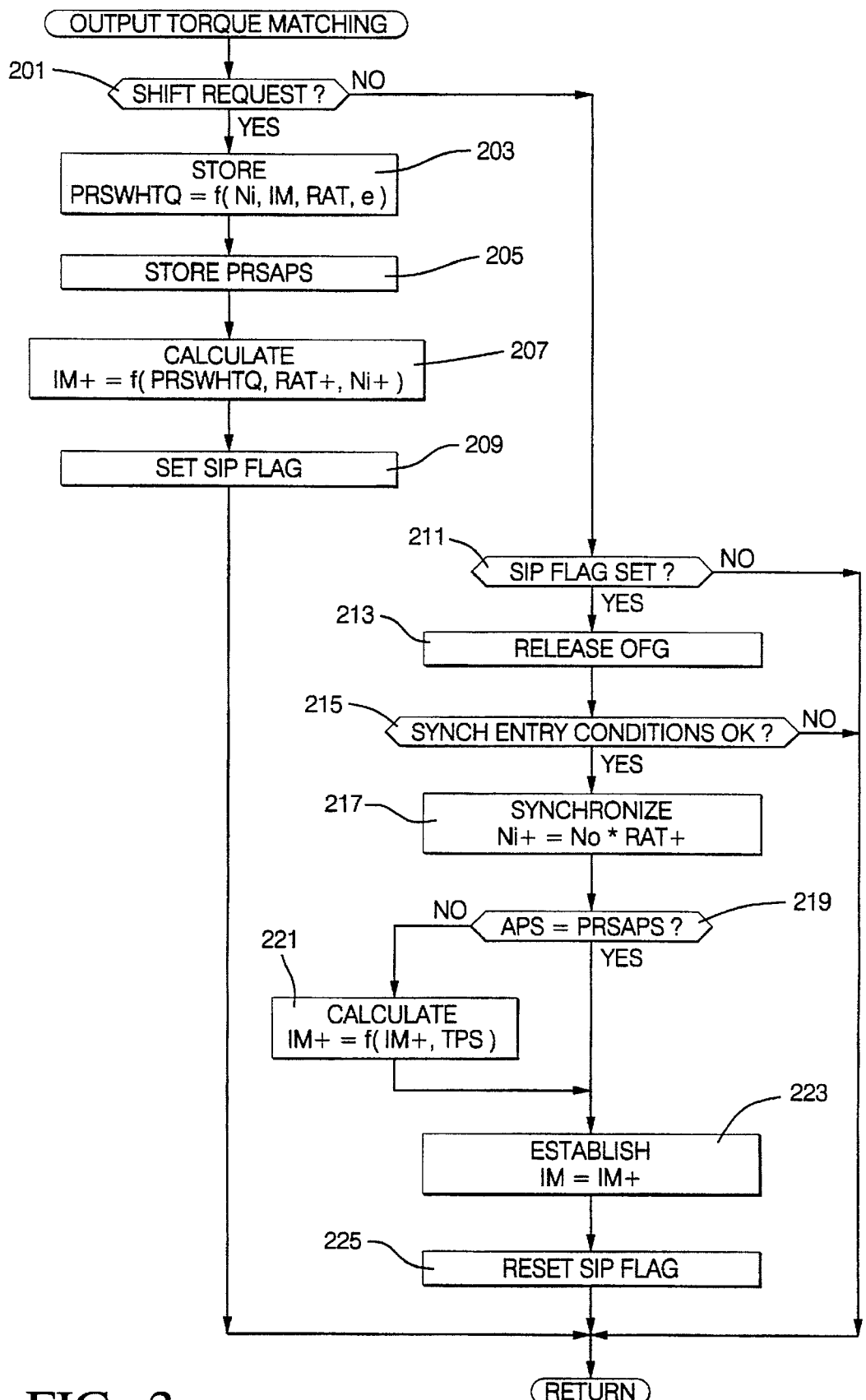
FIG. 2 is a flow diagram representing various program steps for execution by the controller as shown in FIG. 1 for carrying out the control of the present invention.

With reference to the flow chart of FIG. 2, a set of program instructions for execution by the controller 11 illustrated in FIG. 1 for carrying out the present invention is shown. The flow chart represents a part of a much larger set of program instructions for carrying out the overall control of the motor and transmission. The flow chart is representative genetically of any power-on upshift or downshift performed in accordance with the output torque matching of the present invention.

Beginning with block 201, a determination is first made whether a shift request has been made. This corresponds to a conventional shift request when, in accordance with predetermined control criteria, an upshift or downshift is indicated. For example, when the vehicle accelerates past a predetermined speed, a shift request may be invoked to effectuate a shift to a lower speed ratio (higher gear). A shift request is active only upon a first instance to set-up and perform initial tasks represented by blocks 203–209. Thereafter, block 201 would be answered in the negative to cause execution of block 211–225 only.

Assuming a shift request has been established, program steps represented by block 203 are executed to store the pre-shift wheel torque as calculated as a function of a variety of drivetrain operating parameters including input member speed Ni, pre-shift motor current IM, the present speed ratio RAT, and a drivetrain efficiency term 'e'. RAT is preferably a memory stored calibrated value associated with the present gear. The drivetrain efficiency term 'e' is likewise preferably a calibrated value associated with the present gear and accounting for the various characteristic drivetrain losses. Essentially, the input member speed and present motor current IM together fully define the motor torque, or input torque to the transmission, preferably through a two-dimensional look-up table of motor speed vs motor current. This assumes known values for motor slip in the case of AC induction machines. Alternatively, various mathematical representations of the motor output torque vs speed and current characteristics may be employed; however, such techniques are cumbersome and consume significant processor resources. The current speed ratio functions essentially as a weighting factor to account for the torque multiplication of the gear set from input to output when the ratio is greater than unity and torque division when less than unity such as in an overdrive speed ratio.

Next, steps represented by block 205 are executed to store the pre-shift accelerator pedal position, PRSAPS, which is to be used later to determine the propriety of overriding the present control if shift coincident operator input should so determine as explained later. Block 207 next represents the calculation of the post-shift motor current IM+. This is shown to be calculated as a function of the previously determined pre-shift wheel torque, PRSWHTQ, the post-shift speed ratio (RAT+), and the post-shift input member speed (Ni+). The post-shift speed ratio RAT+ is applied as a multiplicative inverse weighting factor to the pre-shift wheel torque PRSWHTQ, which is also the desired post-shift wheel torque, to arrive at an intermediate value for transmission input torque or motor output torque. The post-shift motor torque IM+ necessary to provide a matched pre-shift/post-shift output torque is then preferably looked-up in a two-dimensional table of motor torque vs. motor speed.

As a final step in the set of initial instructions executed in response to a shift request, block 209 sets a shift in progress (SIP) flag.

After the initial instruction set 201–209 is executed, future iterations of block 201 will result in branching to blocks 211–225. First encountered as part of these instructions is block 211 whereat the shift in progress flag determines whether a shift is under way. If a shift is not under way, remaining blocks 213–225 are bypassed. If, however, a shift is being performed, blocks 213–225 are executed in performance of the steps necessary to complete the shift and accomplish the output torque matching.

Block 213 represent program steps for releasing the offgoing clutch, the precise method of which is not critical to the present invention, but which is conventionally practiced by reducing the offgoing clutch fluid pressure from a pre-shift value to a post-shift value at a predetermined rate in open loop fashion. Alternatively, closed loop pressure control to a release pressure profile is also available. Block 215 next determines if it is appropriate to execute steps for achieving synchronism of the input member (and motor) to the desired gear ratio gear set member to which input coupling is effected. For example, it may be desirable to allow for the reduction in offgoing fluid pressure for a predetermined number of control loops or below a threshold level whereat the torque capacity of the offgoing clutch is such that the input member is effectively decoupled from the output member.

If the entry conditions for synchronizing the input member to the gear set are met, the program steps represented by block 217 are executed to synchronize the input to the gear set. As previously mentioned, such synchronism may be accomplished in a variety of ways in accordance with the type of shift (upshift or downshift), desired shift feel, and inertial and shift energy management/dissipation considerations. To reiterate, these ways include input speed pull-up or pull-down through application of the oncoming clutch, natural inertial decay or regenerative energy extraction for input member slow down in the case of upshifts, or input member acceleration through motoring control. The oncoming clutch at this time is understood to be applied at a level sufficient to transfer torque thereacross from the input member to the second speed ratio gear set. It may in fact be fully applied at this stage or continue to be progressively applied with increasing torque capacity.

When synchronous operation has been achieved, the current accelerator pedal position APS is compared with the pre-shift accelerator pedal position PRSAPS previously stored. If the two quantities are substantially equivalent as determined at block 219, then block 221 is bypassed in favor of execution of the steps associated with blocks 223 and 225. The equivalency of the two quantities is indicative of stability in the operator's desired operation. Stepping into or out of the throttle during the shift event would indicate a desired operation of more or less post-shift output torque, respectively, from the pre-shift output torque. Block 221, encountered if such non-equivalency is encountered, provides execution of program steps for recalculating the post-shift motor current IM+ to account for the accelerator pedal position change. This calculation is shown to be based upon the previously determined motor torque for effectuating matched output torques pre-shift and post-shift, and the present accelerator pedal position APS. Alternatively, or in addition to APS, rate of change in accelerator pedal position may be utilized in the recalculation of post-shift motor current.

For both equivalent and nonequivalent accelerator pedal positions, block 223 is encountered to execute steps establishing the actual motor current to the new post-shift level IM+. This is preferably accomplished over a predetermined number of control cycles or time by ramping the current upward or downward from the pre-shift value IM or from the most recent motor current value commanded. The actual motor current at the time of establishing the new post-shift motor current may vary from the pre-shift motor current in accordance with the precise method of synchronization as previously discussed. Finally, block 225 executes program steps for resetting the shift in progress flag, thereby indicating completion of the shift.

We claim:

1. A method of operating an electric vehicle, said vehicle comprising a drivetrain including an electric motor coupled to an automatic multiple speed ratio transmission through an input member thereof to provide output torque at an output member thereof for propelling the vehicle, the output torque being controlled in response to an operator controlled accelerator pedal position, the method comprising the steps:

calculating a pre-shift output torque preceding a ratio change from a first speed ratio to a second speed ratio from a set of predetermined drivetrain operating parameters;

determining a post-shift operating value for a predetermined electric motor operating parameter effective to establish the output torque at the output member following the ratio change at the pre-shift output torque;

establishing the predetermined electric motor operating parameter at the post-shift operating value such that the output torque at the output member subsequent the ratio change is substantially equivalent to the pre-shift output torque.

2. The method of operating an electric vehicle as claimed in claim 1 wherein the predetermined electric motor operating parameter comprises motor current.

3. The method of operating an electric vehicle as claimed in claim 1 wherein the electric motor comprises an AC induction machine and the predetermined electric motor operating parameter comprises slip speed.

4. The method of operating an electric vehicle as claimed in claim 1 wherein the step of establishing the predetermined electric motor operating parameter at the post-shift operating value is accomplished substantially throughout the ratio change.

5. The method of operating an electric vehicle as claimed in claim 1 further including the steps of detecting a change in accelerator pedal position from prior to the ratio change to subsequent the ratio change, and suspending establishment of the predetermined electric motor operating parameter at the post-shift operating value.

6. The method of operating an electric vehicle as claimed in claim 5 further including the step of re-establishing the predetermined electric motor operating parameter at a post-shift operating value such that the output torque at the output member subsequent the ratio change corresponds to the change in accelerator pedal position.

7. A method of operating an electric vehicle, said vehicle comprising a drivetrain including an electric motor coupled to an automatic multiple speed ratio transmission through an input member thereof to provide output torque at an output member thereof for propelling the vehicle, the output torque being controlled in response to an operator controlled accelerator pedal position, the method comprising the steps:

calculating a pre-shift output torque preceding a ratio change from a first speed ratio to a second speed ratio from a set of predetermined drivetrain operating parameters;

determining a post-shift operating value for a predetermined electric motor operating parameter effective to establish the output torque at the output member following the ratio change at the pre-shift output torque;

detecting a change in accelerator pedal position from prior to the ratio change to subsequent the ratio change;

when the change in accelerator pedal position is within a predetermined acceptable range, establishing the predetermined electric motor operating parameter at the post-shift operating value such that the output torque at the output member subsequent the ratio change is substantially equivalent to the pre-shift output torque.

8. The method of operating an electric vehicle as claimed in claim 7 further including the step when the change in accelerator pedal position is outside the predetermined acceptable range, re-establishing the predetermined electric motor operating parameter at a post-shift operating value such that the output torque at the output member subsequent the ratio change corresponds to the change in accelerator pedal position.

* * * * *